US008278585B2

(12) United States Patent
Cheng et al.

(10) Patent No.: US 8,278,585 B2
(45) Date of Patent: Oct. 2, 2012

(54) HOT-WIRE CUTTER

(75) Inventors: Sung-Neng Cheng, Taichung County (TW); Chung-Hsien Lu, Taichung (TW); Sheng-Chih Hsu, Changhua County (TW)

(73) Assignee: Excetek Technologies Co., Ltd., Taichung Industrial Park Taichung (TW)

( * ) Notice: Subject to any disclaimer, the term of this patent is extended or adjusted under 35 U.S.C. 154(b) by 464 days.

(21) Appl. No.: 12/660,219

(22) Filed: Feb. 23, 2010

(65) Prior Publication Data

US 2011/0203436 A1 Aug. 25, 2011

(51) Int. Cl.
*B23H 1/00* (2006.01)

(52) U.S. Cl. .................................................... 219/69.12

(58) Field of Classification Search ........................ None
See application file for complete search history.

(56) References Cited

U.S. PATENT DOCUMENTS 3,987,270 A * 10/1976 Ullmann et al. ........... 219/69.12
7,973,260 B2 * 7/2011 Luo et al. ................... 219/69.12
2009/0194511 A1 * 8/2009 Luo et al. ................... 219/69.12

FOREIGN PATENT DOCUMENTS

JP 60161030 A * 8/1985

* cited by examiner

*Primary Examiner* — David E Graybill
(74) *Attorney, Agent, or Firm* — Charles E. Baxley

(57) ABSTRACT

A hot-wire cutter includes a frame, a tank supported on the frame, a first working head located on a floor of the tank, a second working head movably supported on the frame, a supporting unit supported on the frame and used to support an annular work piece, a restraining unit supported on the frame and used to clamp the annular work piece, and a rotating unit supported on the frame and used to rotate the annular work piece. Thus, a line between the first and second working heads is directed through the centers of initial apertures in the annular work piece, one after another, to facilitate precise processing of sections of the annular work piece corresponding to the initial apertures.

8 Claims, 3 Drawing Sheets

HOT-WIRE CUTTER

BACKGROUND OF INVENTION

1. Field of Invention

The present invention relates to a hot-wire cutter and, more particularly, to a hot-wire cutter for cutting an annular work piece.

2. Related Prior Art

A hot-wire cutter is an important machine tool for cutting metal work pieces precisely. A conventional hot-wire cutter includes a brass wire (or "hot wire") inserted through a work piece. The brass wire discharges to the work piece so that are electric arcs between the brass wire and the work piece. Thus, like a wire saw, the brass wire cuts the work piece. Under the control of an NC program, the conventional hot-wire cutter moves the work piece. Thus, the conventional hot-wire cutter cuts the work piece into a shape according to the NC program with small errors.

The conventional hot-wire cutter is controlled to move in XY/UV planes to find the centers of initial apertures, one after another, before the cutting under the control of the NC program is started. However, if the work piece is an annular element, and apertures are to be made in the work piece in radial directions, much labor and time are required to have the job done. Moreover, the center of processing cannot be retained, and initial apertures must be located in a line. Hence, there will be errors in the angles of the cutting in the final product of the work piece if the conventional hot-wire cutter moves the work piece in an XY plane to find the centers of the initial apertures of the annular work piece.

The present invention is therefore intended to obviate or at least alleviate the problems encountered in prior art.

SUMMARY OF INVENTION

It is the primary objective of the present invention to provide a hot-wire cutter for cutting annular work piece.

To achieve the foregoing objective, the hot-wire cutter includes a frame, a tank supported on the frame, a first working head located on a floor of the tank, a second working head movably supported on the frame, a supporting unit supported on the frame and used to support the annular work piece, a restraining unit supported on the frame and used to clamp the annular work piece, and a rotating unit supported on the frame and used to rotate the annular work piece. Thus, a line between the first and second working heads is directed through the centers of initial apertures in the annular work piece, one after another, to facilitate precise processing of sections of the annular work piece corresponding to the initial apertures.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
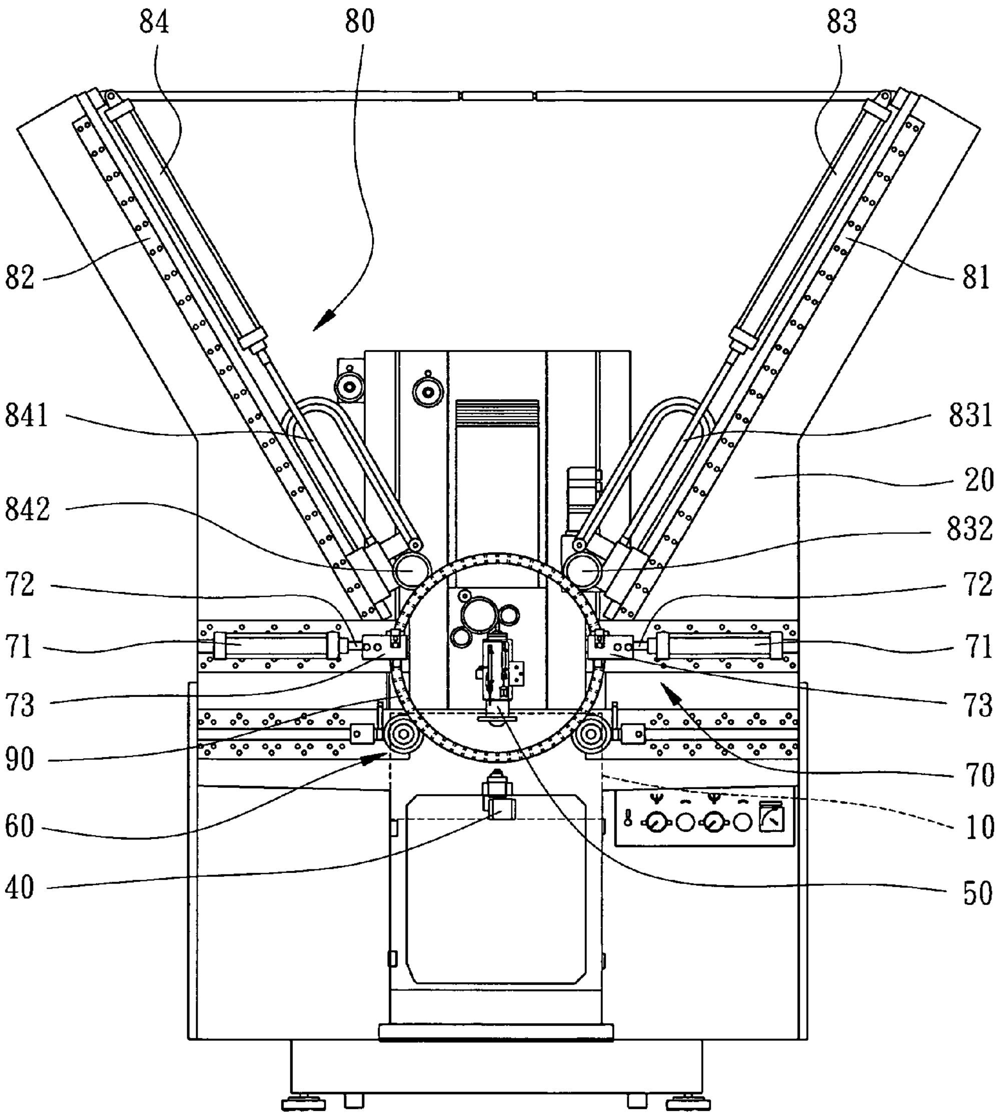
FIG. 1 is a front view of a hot-wire cutter according to the preferred embodiment of the present invention.
Figure 2:
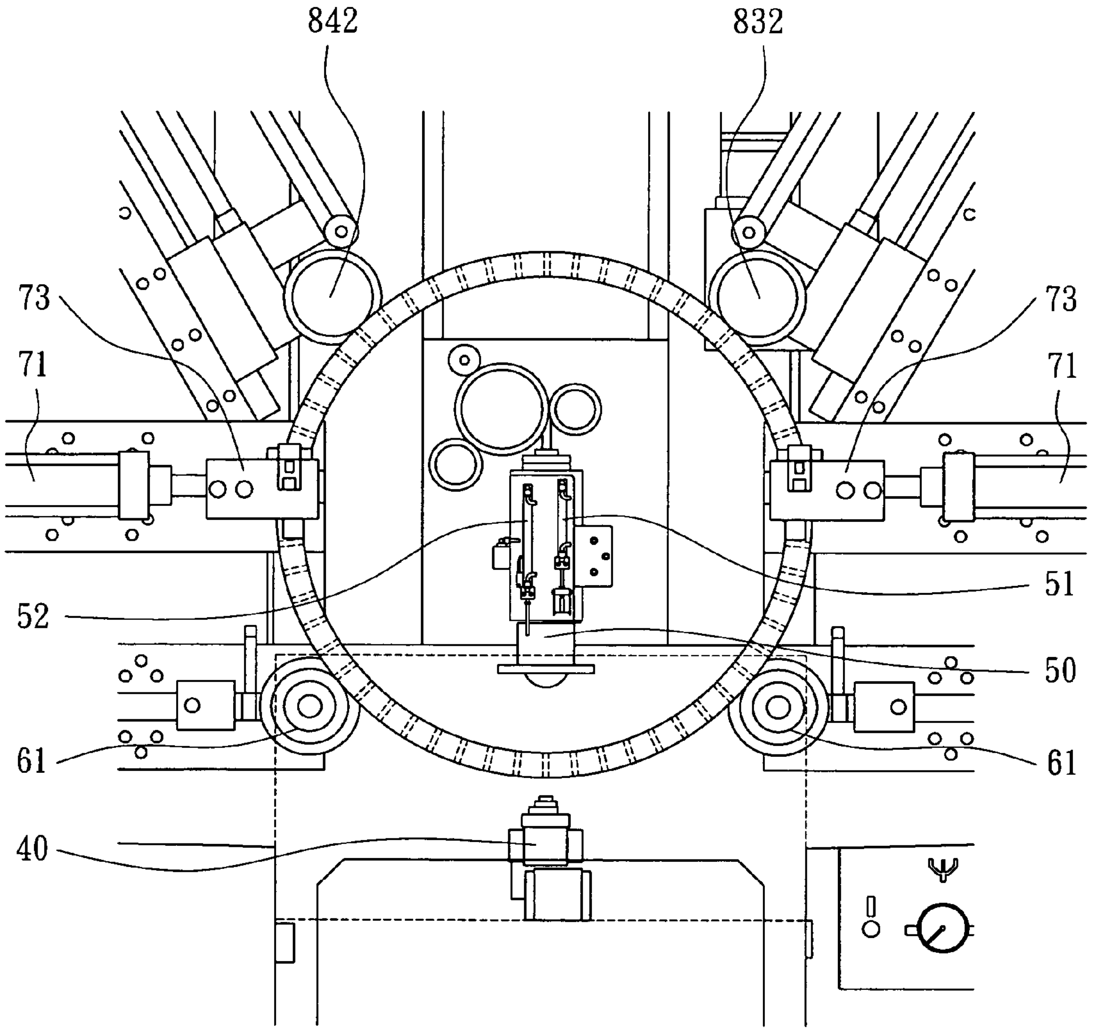
FIG. 2 is an enlarged, partial view of the hot-wire cutter of FIG. 1.
Figure 3:
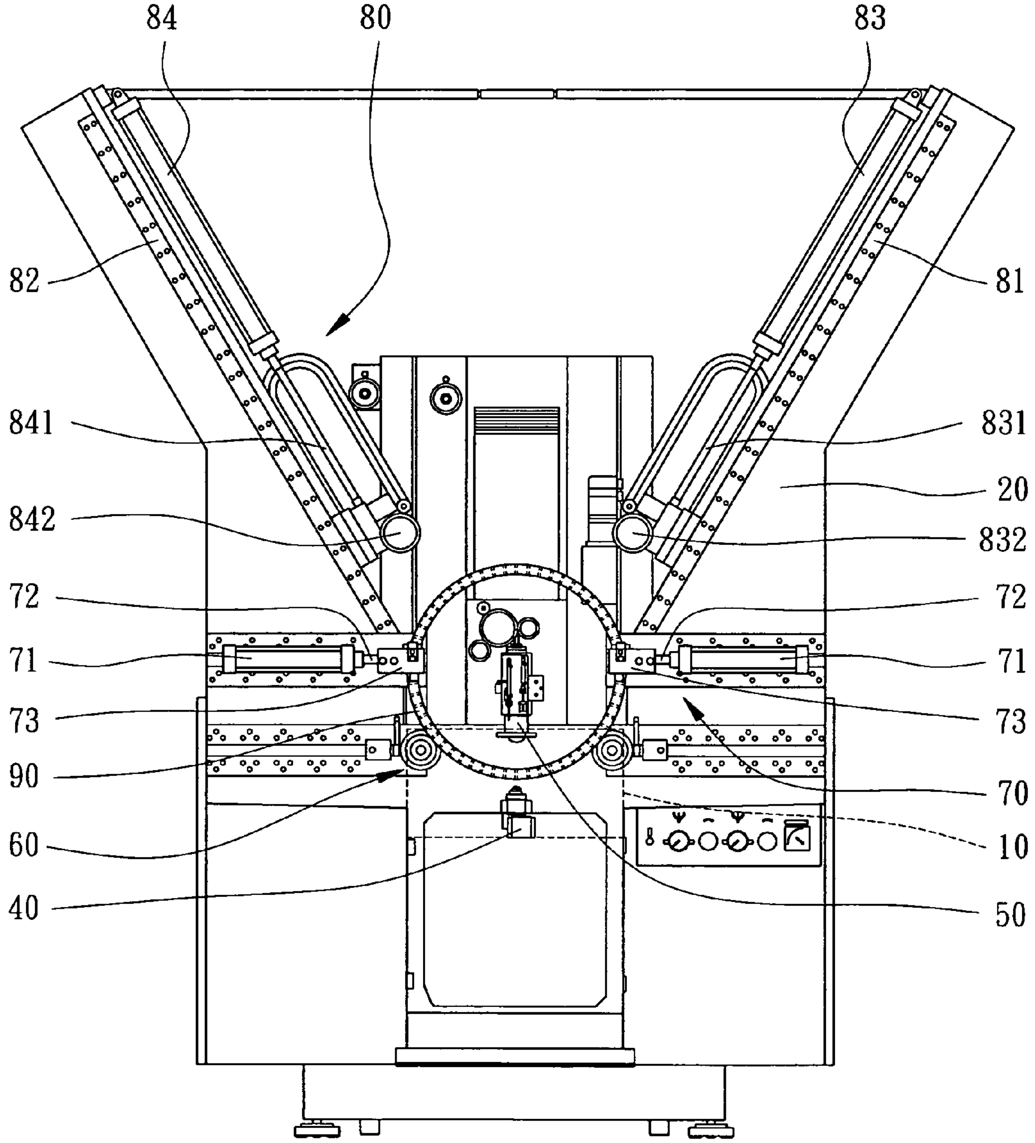
FIG. 3 is a front view of the hot-wire cutter with a rotating unit in another position than shown in FIG. 1.

Referring to FIGS. 1 through 3, a hot-wire cutter includes a tank 10, a frame 20, a programmable control unit (not shown), a lower working head 40, an upper working head 50, a supporting unit 60, a restraining unit 70 and a rotating unit 80 according to the preferred embodiment of the present invention. The tank 10 is supported on the frame 20. The control unit is located in the frame 20. The lower working head 40 is located on the floor of the tank 10. The upper working head 50 is vertically movably supported on the frame 20. The supporting unit 60, the restraining unit 70 and the rotating unit 80 are located on the frame 20 in order. A line between the working heads 40 and 50 is in perpendicular to the floor of the tank 10. The working heads 40 and 50 and the units 70 and 80 are electrically connected to the programmable control unit.

The supporting unit 60 includes two circular beams 61 horizontally provided on the frame 20. The circular beams 61 support an annular work piece 90. The shortest distance of one of the circular beams 61 from the line between the working heads 40 and 50 is identical to the shortest distance of the other circular beam 61 from the line between the working heads 40 and 50. Thus, the center of the annular work piece 90 is inherently located in the line between the working heads 40 and 50 when the annular work piece 90 is supported on the circular beams 61. The circular beams 61 can be replaced with rollers in another embodiment.

The restraining unit 70 restrains the annular work piece 90 from tilting. The restraining unit 70 includes two synchronous hydraulic sets between which the upper working head 50 is located. Each of the hydraulic sets includes a hydraulic cylinder 71 supported on the frame 20, a piston rod 72 with an end movably inserted in the hydraulic cylinder 71, and a block 73 connected to another end of the piston rod 72. The hydraulic cylinders 71 are located in a horizontal line, and so are the piston rods 72. The blocks 73 are movable along a horizontal path to restrain the annular work piece 90 under the control of the programmable control unit. The blocks 73 keep a plane defined by the annular work piece 90 vertical while allowing the rotation of the annular work piece 90.

The rotating unit 80 includes first and second bars 81 and 82 provided on the frame 20 and first and second hydraulic sets supported on the bars 81 and 82, respectively. The bars 81 and 82 form a V-shaped structure. The first hydraulic set includes a hydraulic cylinder 83 connected to the first bar 81, a piston rod 831 with an end movably inserted in the hydraulic cylinder 83, and a motor 832 attached to another end of the piston rod 831. The second hydraulic set includes a hydraulic cylinder 84 connected to the second bar 82, a piston rod 841 with an end movably inserted in the hydraulic cylinder 84, and an angle feedback controller 842 attached to another end of the piston rod 841. Under the control of the programmable control unit, the hydraulic cylinders 83 and 84 respectively make the piston rods 831 and 841 respectively move the motor 832 and the angle feedback controller 842 to the annular work piece 90.

To increase the precision in the processing of the annular work piece 90, an aperture detector 51 is located on the upper working head 50. The aperture detector 51 is electrically connected to the programmable control unit.

To prevent debris of the annular work piece 90 from hitting and damaging the lower working head 40, a debris detector 52 is located on the upper working head 50. The debris detector 52 is electrically connected to the programmable control unit.

The operation of the hot-wire cutter will be described. The annular work piece 90 is located on the circular beams 61. The annular work piece 90 is restrained by the blocks 73 attached to the piston rods 72 extending from the hydraulic cylinders 71 of the restraining unit 70. The motor 832 attached to the piston rod 831 extending from the first hydraulic cylinder 83 is abutted against the annular work piece 90. The angle feedback controller 842 attached to the piston rod 841 extending from the second hydraulic cylinder 84 is abutted against the annular work piece 90. The motor 832 rotates the annular work piece 90.

The aperture detector 51 detects initial apertures, one after another, under the control of the programmable control unit. Biases of the positions of the initial apertures are recorded in the programmable control unit. The errors are compensated when a hot wire is inserted through the initial apertures, one after another. After all of the initial apertures are detected by the aperture detector 51, sections of the annular work piece 90 corresponding to the initial apertures can be processed, one after another.

If the debris is not completely expelled from the annular work piece 90, it might drop and hit and damage the lower working head 40. Therefore, after the processing of a current section of the annular work piece 90 is finished and before the processing of a next section of the annular work piece 90 is started, the debris detector 52 detects the current section of the annular work piece 90 to determine whether all of the debris is removed. If not, the debris detector 52 makes the motor 832 stop and set an alert. By controlling the motor 832, the rotation of the annular work piece 90 can be reversed so that any previous section of the annular work piece 90 can be checked by the debris detector 52 again. The process of a section of the annular work piece 90 means inserting the hot wire in a related initial aperture and enlarging the initial aperture by cutting further into the section of the annular work piece 90.

The angle feedback controller 842 detects the angle of the rotation of the annular work piece 90 and compares the detected angle with the angle of the rotation of the motor 832 to make sure that the motor 832 does not slide on the annular work piece 90.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A hot-wire cutter comprising:

a frame (20);

a tank (10) supported on the frame (20);

a first working head (40) located on a floor of the tank (10);

a second working head (50) movably supported on the frame (20);

a supporting unit (60) supported on the frame (20) and used to support an annular work piece (90);

a restraining unit (70) supported on the frame (20) and used to clamp the annular work piece (90); and a rotating unit (80) supported on the frame (20) and used to rotate the annular work piece (90) so that a line between the first and second working heads (40, 50) is directed through the centers of initial apertures in the annular work piece (90), one after another, to facilitate precise processing of sections of the annular work piece (90) corresponding to the initial apertures.

2. The hot-wire cutter according to claim 1, wherein the supporting unit (60) includes two beams (61) projecting from the frame (20), wherein the smallest distance of one of the beams (61) from a line between the first and second working heads (40, 50) is identical to the smallest distance of the other beam (61) from the line between the first and second working heads (40, 50) so that the center of the annular work piece (90) is located in the line between the first and second working heads (40, 50) when the annular work piece (90) is located on the beams (61).

3. The hot-wire cutter according to claim 1, wherein the restraining unit (70) includes two synchronous hydraulic sets between which the upper working head (50) is located, wherein each of the hydraulic sets includes:

a hydraulic cylinder (71) provided on the frame (20);

a piston rod (72) with an end movably inserted in the hydraulic cylinder (71); and a block (73) connected to another end of the piston rod (72) so that the blocks (73) are movable to restrain the annular work piece (90) to a position to keep a plane defined by the annular work piece (90) vertical while allowing the rotation of the annular work piece (90).

4. The hot-wire cutter according to claim 3, wherein the piston rods (72) are movable along a same line.

5. The hot-wire cutter according to claim 1, wherein the rotating unit (80) includes:

a first bar (81) provided on the frame (20);

a first hydraulic cylinder (83) connected to the first bar (81);

a first piston rod (831) with an end movably inserted in the first hydraulic cylinder (83), and a motor (832) attached to another end of the first piston rod (831), wherein the first hydraulic cylinder (83) makes the first piston rod (831) move the motor (832) to the annular work piece (90) so that the motor (832) rotates the annular work piece (90).

6. The hot-wire cutter according to claim 5, wherein the rotating unit (80) includes:

a second bar (82) provided on the frame (20);

a second hydraulic cylinder (84) connected to the second bar (82);

a second piston rod (841) with an end movably inserted in the second hydraulic cylinder (84); and an angle feedback controller (842) attached to another end of the second piston rod (841), wherein the second hydraulic cylinder (84) makes the second piston rod (841) move the angle feedback controller (842) to the annular work piece (90) so that the angle feedback controller (842) measures the angle of the rotation of the annular work piece (90) and compares with the angle of the rotation of the motor (832) to make sure that the motor (832) does not slide on the annular work piece (90).

7. The hot-wire cutter according to claim 1, further including an aperture detector an aperture detector (51) located on the upper working head (50), wherein the aperture detector (51) detects initial apertures defined in the annular work piece (90), one after another, records biases of the positions of the initial apertures, and compensates the errors when a hot wire is connected through the initial apertures, one after another.

8. The hot-wire cutter according to claim 1, further including a debris detector (52) located on the upper working head (50), the debris detector (52) detects each aperture cut in the annular work piece (90) to determine whether all debris is cleared after the processing of the aperture and before the processing of a next aperture in the annular work piece (90).

* * * * *